United States Patent
Tomikawa et al.

(10) Patent No.: US 6,309,759 B1
(45) Date of Patent: Oct. 30, 2001

(54) SLIDING BEARING AND ITS PRODUCTION METHOD

(76) Inventors: Takashi Tomikawa, c/o Taiho Kogyo Co., Ltd. 65, Midorigaoka 3-chome, Toyota-shi, Aichi 471-8502 (JP); Hirofumi Michioka; Yoshio Fuwa, both of c/o Toyota Jidosha Kabushiki Kaisha 1, Toyota-cho, Toyota-shi, Aichi 471-8572 (JP); Yoshio Shimura; Shigeru Hotta, both of c/o Kabushiki Kaisha Toyota Chuo Kenkyusho 41-1, Yokomichi Nagakute, Nagakute-cho, Aichi-gun, Aichi 480-1192 (JP)

( * ) Notice: Subject to any disclaimer, the term of this patent is extended or adjusted under 35 U.S.C. 154(b) by 0 days.

(21) Appl. No.: 09/612,102

(22) Filed: Jul. 7, 2000

(30) Foreign Application Priority Data

Jul. 8, 1999 (JP) .................................................. 11-193970

(51) Int. Cl.$^7$ ...................................................... B32B 15/01
(52) U.S. Cl. .......................... 428/642; 205/149; 205/238; 205/261; 384/912; 428/643; 428/644; 428/650; 428/674; 428/675; 428/680; 428/926; 428/935; 508/103
(58) Field of Search ..................................... 428/642, 650, 428/643, 644, 674, 675, 680, 926, 935; 205/149, 238, 261; 384/912; 508/103

(56) References Cited

U.S. PATENT DOCUMENTS

| 4,216,270 | * | 8/1980 | Lawless et al. | 508/103 |
| 4,551,395 | * | 11/1985 | Lloyd | 384/912 |

FOREIGN PATENT DOCUMENTS

| 0244396-A2 | * | 11/1987 | (EP) | 384/912 |
| 0795693-A2 | * | 9/1997 | (EP) | F16C/33/12 |
| 8-20893-A | * | 1/1996 | (JP) | C25D/7/10 |

\* cited by examiner

Primary Examiner—Robert R. Koehler
(74) Attorney, Agent, or Firm—Armstrong, Westerman, Hattori, McLeland & Naughton LLP

(57) ABSTRACT

A sliding bearing, which comprises a lining and a bismuth or bismuth-alloy overlay having improved compatibility and fatigue resistance is provided. The overlay is characterized by the following orientation. The relative ratio of the X-ray diffraction intensity $I_{[hkl]}$ of the bismuth or bismuth-alloy overlay defined below satisfies the following conditions (a) and (b):

(a) the relative ratio of the X-ray diffraction intensity $I_{[hkl]}$ of planes other than the {012} planes is from 0.2 to 5 times as high as the ratio of the X-ray diffraction intensity $I_{[012]}$, namely, $0.2I_{[012]} \leq I_{[hkl]} \leq 5I_{[012]}$ (b) the relative ratio of the X-ray diffraction intensity $I_{[hkl]}$ of three or more planes other than {012} planes ranges from 0.5 to 2 times as high as the ratio of the X-ray diffraction intensity $I_{[012]}$, namely, $0.5I_{[012]} \leq 2I_{[012]}$.

14 Claims, 7 Drawing Sheets

HYDRAULIC 2.8μm 5.8μm 10.6μm

SLIDING BEARING AND ITS PRODUCTION METHOD

BACKGROUND OF INVENTION

1. Field of Invention

The present invention relates to a sliding bearing, more particularly to a sliding bearing which comprises; a bearing-alloy layer referred to as the lining and consisting of copper-lead alloy or an aluminum alloy; and an overlay, which consists of a soft-alloy plating layer and is deposited on the lining to impart compatibility; and a Ni plating barrier layer and the like occasionally formed between the lining and the overlay. The present invention also relates to a method for producing the sliding bearing.

2. Description of Related Art

The sliding bearing described above is used mainly for the journal portion of a crankshaft, or the big end of a connecting rod of an internal combustion engine. Lead alloys are mainly used as the overlay and, occasionally, tin alloys.

One of the present applicants has succeeded in improving the composition of the lead overlay alloy as seen in German Patent No. 3000379 and improving the crystal orientation as seen in Japanese Unexamined Patent Publication (kokai) No. 8-20893.

Since lead is an environmental pollutant, discontinuance of its use or reduction in the amount of its use is requied. A development for avoiding the use of lead as the overlay is directed towards bonding such tribological material as $MoS_2$ with resin to form the overlay film. In addition, one of the present applications proposed in European Patent Publication No. 0795693A2 a Cu—Ag alloy which may not necessitate an overlay.

Incidentally, bismuth is a low-melting point metal as lead is. Bismuth is harder and more brittle than lead. Specifically, the hardness $Hv_{0.2}$ of lead is 5, while the hardness $Hv_{0.2}$ of bismuth is 10. The electro-plating, which is frequency used in the formation of an overlay, hardens the resultant layer due to absorption of hydrogen. That is, the hardness $Hv_{0.2}$ of electro-plated lead is 10, while the hardness $Hv_{0.2}$ of conventionally electro-plated bismuth is approximately 20. Such property of bismuth is inappropriate to attain fatigue resistance and compatibility of the sliding material. Bismuth has, therefore, not been used for the sliding material.

Meanwhile, the low-melting property of bismuth is utilized in the bismuth-based soldering alloy or the bismuth-based core of a mold. Bismuth is also used for semiconductor material, electronic material, optical recording media (for example, Japanese Unexamined Patent Publication No. 4-51742), and magnet material (Mn—Bi magnet). This recording medium is prepared by sputtering.

The present inventors made extensive researches into the replacement of lead with bismuth, in an attempt to utilize the better corrosion resistance of bismuth in acidic solution than that of lead and to avoid the toxicity of lead.

SUMMARY OF INVENTION

It is an object of the present invention to discover bismuth material which exhibits the fatigue resistance and compatibility required for an overlay, and to provide an improved sliding bearing.

It is also an object of the present invention to provide a method for producing a sliding bearing which comprises a bismuth or bismuth-alloy overlay, the crystals of which are so oriented that the fatigue resistance and compatibility are outstandingly improved as compared with essentially random-oriented bismuth crystals or essentially, or completely, single crystalline bismuth crystals.

The present invention involves a discovery that the hard and brittle properties of bismuth can be ameliorated to such a level that they present no serious problem by means of controlling the orientation of bismuth crystals.

The sliding bearing proposed by the present invention comprises a lining and a bismuth or bismuth-alloy overlay formed on the lining with or without the intermediary of a barrier layer, characterized in that the relative ratio of the X-ray diffraction intensity $I_{[hkl]}$ defined below satifies the following (a) and (b):

(a) the relative ratio of the X-ray diffraction intensity $I_{[hkl]}$ of planes other than {012} is from 0.2 to 5 times as high as the ratio of the X-ray diffraction intensity $I_{[012]}$, namely, $0.2I_{[012]} \leq I_{[hkl]} \leq 5I_{[012]}$ (b) the relative ratio of the X-ray diffraction intensity $I_{[hkl]}$ of three or more planes other than {012} falls within a range from 0.5 to 2 times as high as the relative ratio of the X-ray diffraction intensity $I_{[012]}$, namely, $0.5I_{[012]} \leq I_{[hkl]} \leq 2I_{[012]}$.

The definition of the relative ratio of the X-ray diffraction intensity $I_{[hkl]}$ is as follows: the {hkl} planes of bismith crystals of standard powder samples having random orientation indicate the X-ray diffraction intensity Rp (hkl); the {hkl} planes of bismuth crystals of said bismuth or bismuth-alloy overlay indicate the X-ray diffraction intensity $R_{O/L}$ (hkl); the ratio of both intensities is expressed by K (hkl)= $R_{O/L}$ (hkl)/Rp (hkl); the ratio K (012), namely, K (hkl) of the {012} plane and the K (hkl) of the X-ray diffraction intensity at the {hkl} plane are converted to the ratio of the X-ray diffraction intensity $I_{[hkl]}$=K(hkl)/K(012).

The method for producing a sliding bearing according to the present invention comprises the steps of:

preparing a backing metal in the form of a strip;

preparing a lining in the form of a strip consisting of one material selected from the group consisting of an aluminum bearing-alloy and a copper bearing-alloy;

bringing said lining into contact with an electrolytic solution which contains methanesulfonic acid and bismuth methane sulfonate; and, cathodically depositing bismuth on said lining.

Another electrolytic solution may contain sulfuric acid and bismuth sulfate.

In one aspect of the present invention, there is provided use of bismuth or bismuth alloy satisfying the conditions (a) and (b) mentioned above to an overlay of a sliding bearing.

DESCRIPTION OF PREFERRED EMBODIMENTS

The present invention is described hereinafter in detail.

Bismuth is a rhombohedral crystal which is equivalent to a hexagonal crystal. Generally, the Miller index of the hexagonal crystal is expressed by four parameters (h, k, i, l). Here, h, k and i indicate the $a_{1,2,3}$ axes, respectively. The symbol "l" indicates the index of the c axis. Since the relationship h+k=−i is established in the Bi crystal, the parameter i is omitted, and the three parameters (h k l) are used to define the lattice planes of a bismuth crystal.

The Bi or Bi alloy layer is collectively referred to as the "Bi layer" except for the description of their composition. The Bi layer has an intermediate orientation between the completely random one such as that of the fine powder and a particular orientation such as that of the single crystal.

The orientation is evaluated as follows.

First, the Bi crystals having completely random orientation such as the powder are subjected to the X-ray diffraction. The resultant diffraction intensity of the respective planes is Rp (hkl). Likewise, the Bi crystals of an overlay are subjected to the X-ray diffraction. The resultant diffraction intensity of the respective planes is $R_{O/L}$ (hkl). Then, their ration K (hkl)=$R_{O/L}$ (hkl)/Rp (hkl) is calculated. In the case of K (hkl) ) 1, it turns out that the Bi crystals of an overlay are oriented in (hkl).

Note that there are two K (hkl) of the Bi crystals, i.e., K(hkl) of {012} and K(hkl) of the planes other than {012}. Their relative magnitude is calculated as the ratio $I_{[hkl]}$=K (hkl)/K (012). If $I_{[hkl]}$≡0, it turns out that a {012} single crystal is formed. On the other hand, if $I_{[hkl]}$>>1, it turns out that (hkl) crystals are intensely oriented. If K (012)=1, and K (hkl)=1, the Bi crystals are random or are completely non-oriented. In this case, $I_{[hkl]}$ is 1 for each (hkl) plane. ON the contrary, even if $I_{[hkl]}$ is 1 for several (hkl) planes, but several other planes have $I_{[hkl]}$ not equal to 1, the crystals are not completely random-oriented but are oriented to a particular orientation. Neither the {012} single crystal having $I_{[hkl]}$≡0 nor the completely random-oriented crystals having $I_{[hkl]}$≡1 exhibit improved properties as the overlay. These crystals as well as the essentially single crystalline and the essentially random-oriented crystals are, therefore, excluded out from the present invention. The intense orientation to a particular crystal plane is also excluded as explained hereinafter.

In the conditions (a) by (b) by using $I_{[hkl]}$, $I_{[hkl]}$ and $K_{[012]}$ are compared with one another. Contrary to this, for example, a condition is set such that K (hkl)≧n, that is, the orientation is evaluated only by K (hkl), then it becomes difficult to control the orientation degree of the non {012} planes relative to the {012} planes and hence to control the tribological properties. The condition (a), namely $0.2I_{(013)} \leq I_{(hkl)} \equiv 5I_{[012]}$, involves a concept that the {012} planes are used as standard and the relative orientation degree is controlled within a certain range. On the other hand, if $I_{[hkl]}>5I_{[012]}$, the non {012} planes are so intensely oriented that the overlay properties are not improved. If $I_{[hkl]}<0.2I_{[012]}$ the orientation of {012} planes is so intense that the overlay properties are likewise not improved. Preferably, $0.5I_{[012]} \leq I_{[hkl]} \leq 2I_{[012]}$.

In addition to condition (a), the condition (b) is stipulated, that is, three or more planes have a preferential orientation not less than 0.5 times and not more than twice as high as $I_{[012]}$. Three or more planes other than {012} may be preferentially oriented provided that the degree of their orientation is limited to be within a non-excessive range as stipulated under the condition (b). The conditions (a) and (b) are, therefore, the criterion which determines either brittleness or ductility of bismuth.

It is possible to almost completely control the brittleness and hardness of the Bi crystal layer by means of controlling the diffraction intensity of the three planes, i.e., {104}, {110} and {202} planes of the Bi crystal layer. Adjusting the electro-plating conditions can, in turn, control this diffraction intensity. Here, additionally to {012} plane, since {104}, {110} and {202} planes have greater X-ray diffraction intensity than the other planes, the conditons (a) and (b) mentioned above can be satisfied by adjusting the diffraction intensity of these three planes and hence $I_{[hkl]}$ of the {104}, {110}and {202}. The desired properties can be attained in almost all cases by controlling the X-ray diffraction intensity of the above-mentioned three planes. The desired properties can be attained with higher certainly, when additionally {105}, {113}, {116}, {107}, {122}, {214} and {300} satisfy the above relationships (a) and (b).

The crystal grains of Bi plating are preferably 10 μm or less, more preferably 5 μm or less. When the grain size exceeds 10 μm, the fatigue resistance is seriously impaired to a lower level than that required for an overlay. The overlay is preferably from 2 to 20 μm thick, more preferably from 5 to 12 μm thick, In the present invention, the overlay may consist of a Bi alloy, which may contain 5% by weight or less of the total of Sn, In, Sb and the like. These elements are known as the additive elements of a Pb overlay. These elements contribute to enhancement of the compatibility and the fatigue resistance in the Bi-based alloy. However, when the amount of these elements exceeds 5% by weight, the melting point of the overlay is so lowered as to impair the properties of the overlay.

The Cu-or Al-based sliding bearing alloys and the Ni barrier are known per se. In the present invention, broad variations of such alloys and the Ni barrier can be used, and the invention is not at all limited by such alloys and the Ni barrier.

In the method for forming the sliding bearing according to the present invention, the steps of pressure-bonding of the backing with the lining are known. The inventive method is characterized by an electro-plating process which results in orientation of the crystal grains as described above.

Preferably, the following electro-plating baths are employed to control the orientation as described above.

(1) Methanesulfonic acid bath A
  Composition of bath: 50 to 250 ml/l of methanesulfonic acid, and 50 to 250 ml/l of bismuth methane sulfonate, and 0.5 to 50 g/l of β naphthol
  Bath temperature: 25° C.
  Current density: 0.5–5.0 A/dm²

(2) Methanesulfonic acid bath B
  Composition of bath: 50 to 200 ml/l of methanesulfonic acid, and 50 to 250 ml/l of bismuth methane sulfonate, and 0.5 to 50 g/l of polyoxyethylene nonylphneyl ether
  Bath temperature: 25° C.
  Current density: 0.5–5.0 A/dm²

(3) Sulfuric acid bath
  Composition of bath: 50 to 120 ml/l of sulfuric acid, and 5 to 30 g/l of bismuth nitrate, and 0.5 to 50 g/l of polyoxyethylene nonylphneyl ether
  Bath temperature: 25° C.
  Current density: 0.5–5.0 A/dm²

EXAMPLES

The present invention is hereinafter described with reference to the examples and the comparative examples.

The sliding bearings prepared in the following examples and comparative examples had the following structure.

Backing metal: steel sheet (SPCC, 1 mm of thickness)
Sliding bearing alloy: Cu—Sn—Ag alloy (European Patent Publication 0795693A1)
Ni barrier: not used
Overlay: 6 μm thick pure Bi The testing conditions were as follows.

Figure 1:
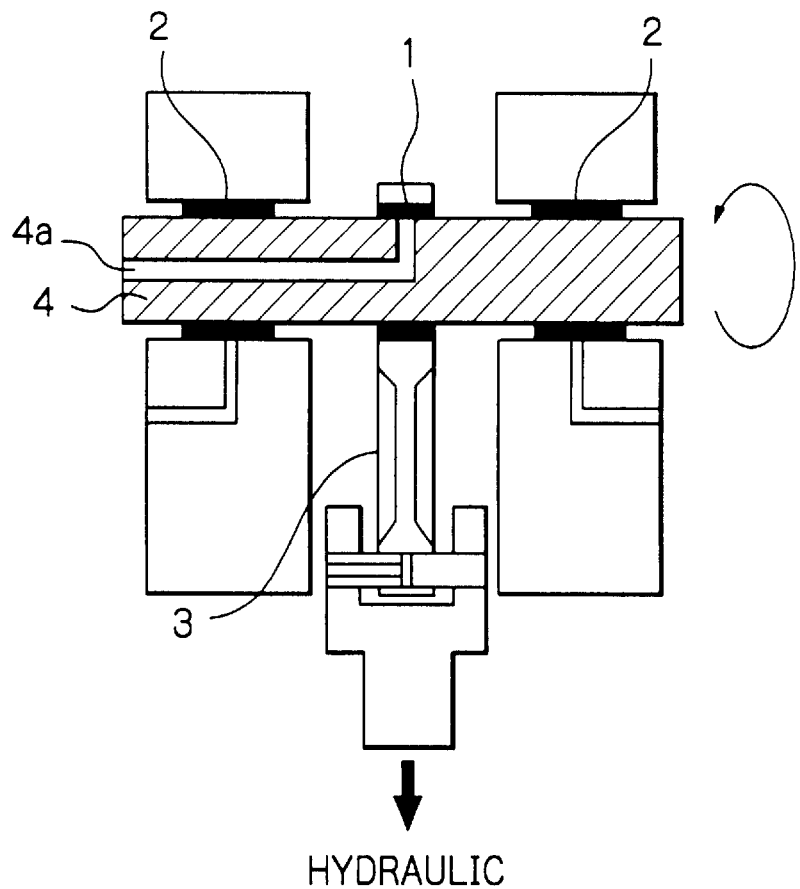
FIG. 1 schematically illustrates a reciprocating dynamic load tester.
Figure 2:
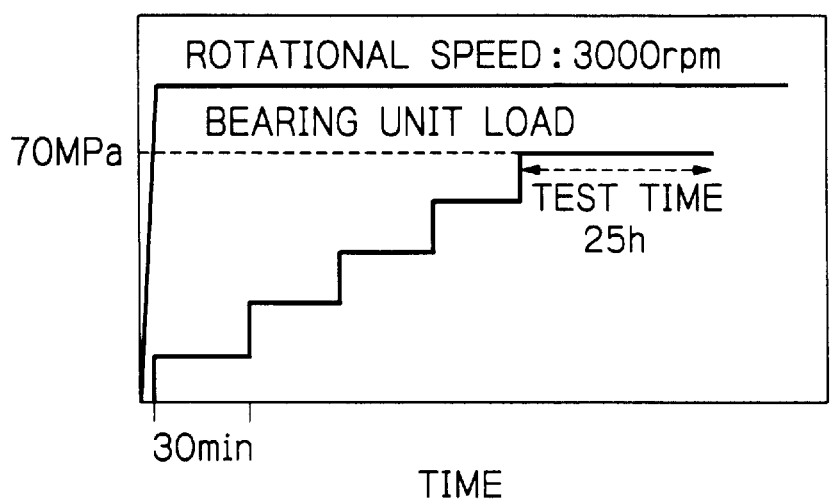
FIG. 2 is a graph showing a test pattern of the reciprocating dynamic load tester.

Tester: reciprocating dynamic load tester (c.f. FIG. 1)
Sliding speed: 6.6 m/second (3000 rpm, c.f. FIG. 2)
Bearing unit load: gradual load-increase (c.f. FIG. 2)
Dimension of bearing: 42 mm in diameter and 17 mm in width
Material of shaft: S55C (hardened)
Kind of lubricating oil: 7.5 W–30 SE
Temperature of oil fed: 120° C.
Testing time: 25 b Referring to FIG. 1, a reciprocating dynamic load tester is illustrated The reference numerals denote the following parts: 1—the bearing tested; 2—holding bearing of a shaft 4: 3—connecting rod; 4—shaft, i.e., the opposing shaft; and 4a—oil-feeding port. The bearing 1 mounted is in local contact with the shaft 4. This test will lead to such results that: when the initial compatibility of the overlay is poor, fatigue occurs; and, even if the initial compatibility of the overlay is good, when the material properties of the overlay are poor, seizure readily occurs.

Bi plating layer of Examples 1 through 3 and Comparative Examples 4 through 6 as well as the Bi powder were subjected to the X-ray diffraction (Cu Kα ray). The resultant $I_{[hkl]}$ is given in Table 1. The diffraction intensity of (024) shown in Table 1 is that which is relative with respect to the (012). Since (024) and (012) are equivalent, crystallographically, $I_{[024]}$ should be equal to $I_{[012]}$. However, since the diffraction intensity of the higher Miller index tends to be lower due to the influence of the penetration depth of X-ray and the like, $I_{[024]} \leq I_{[012]}$. These facts should be taken into consideration when the results of Table 1 are to be evaluated. The following evaluations can be made.

(i) Neither examples nor comparative examples are completely random-oriented or single crystalline.

(ii) In Comparative Example 5, the (104) plane is strongly oriented in terms of $1_{[104]}=5.22$. Such strong orientation is not seen in Examples 1 through 3.

(iii) In Comparative Example 4, since $I_{[104]}$, $I_{[113]}$, $I_{[202]}$, $I_{[116]}$, $I_{[122]}$, and $I_{[214]}$ are extremely small, the {012} planes are relatively intensely oriented. In Comparative Example 5, $I_{[104]}$ and $I_{[300]}$ are over 5, that is, more than five times $I_{[012]}$. The diffraction intensity of the other planes is low. The plating layer of Comparative Example 5 is, therefore, preferentially oriented in the two orientations, {104} and {300}.

(iv) Examples 1 through 3 satisfy the conditions (a) and (b) mentioned above. That is, since there is no extremely strong orientation in the particular orientations, the condition (a) is fulfilled. The number of preferentially oriented planes stipulated under the condition (b) is three or more and is hence appropriate. The preferential orientation is, therefore, not limited to a particular few planes. Incidentally, the intensity of the (012) plane among the {012} planes is set as one. Even if the intensity of the equivalent (024) plane is set as one and is used for the basis of the calculation, the same results will be obtained.

Figure 3:
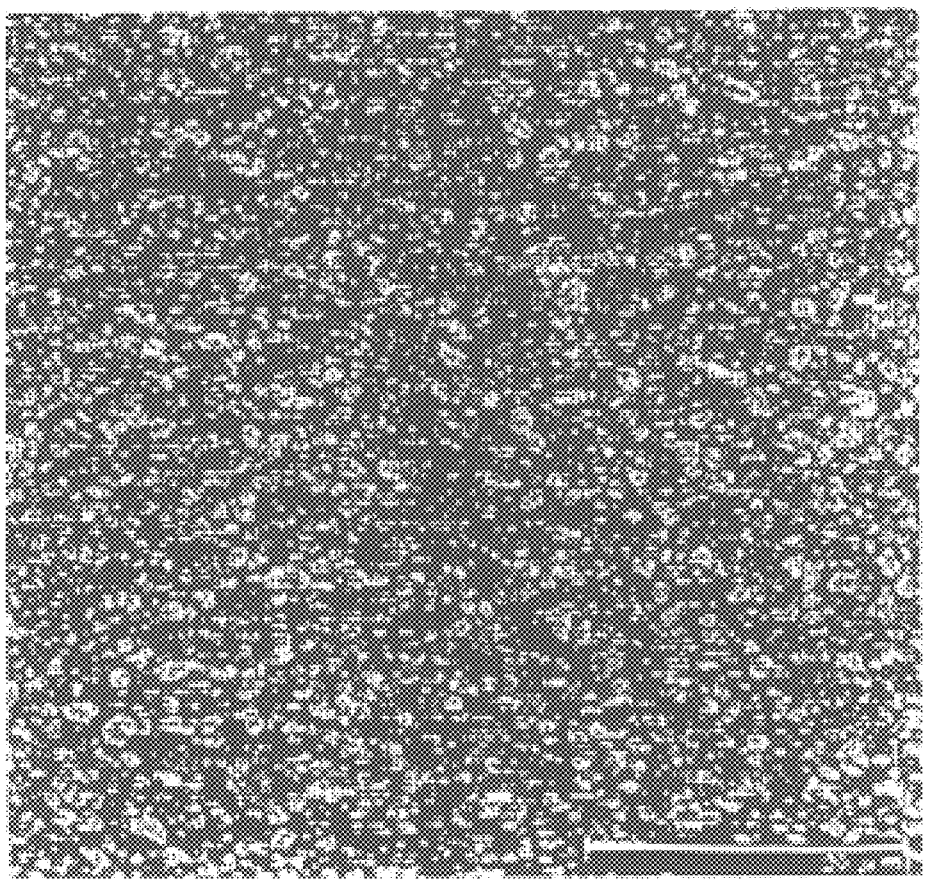
FIG. 3 is a photograph showing the surface plating structure of Example 1.
Figure 4:
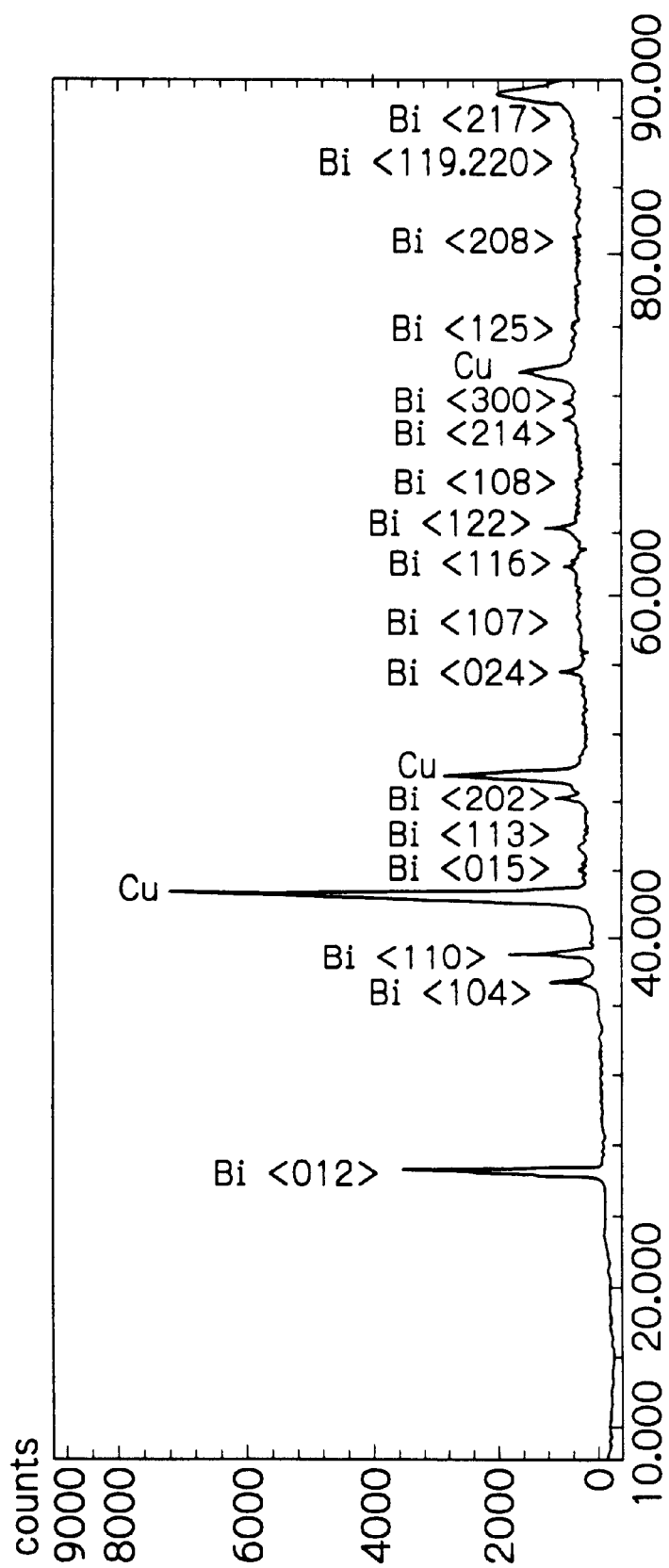
FIG. 4 is the X-ray diffraction chart of the plating layer formed in Example 1.
Figure 5:
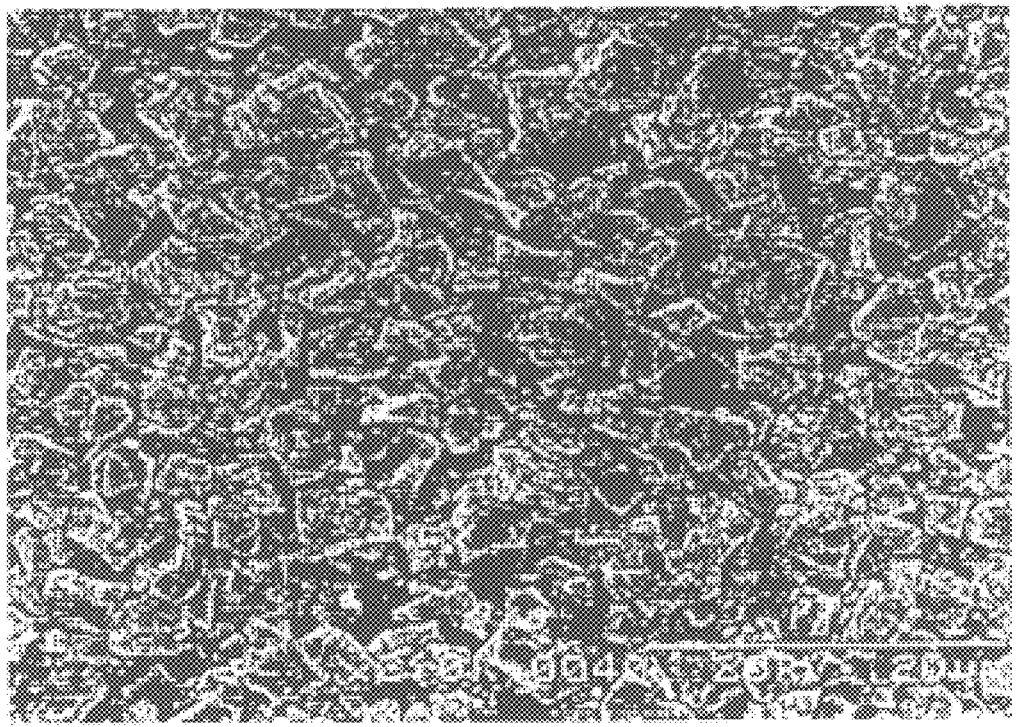
FIG. 5 is a photograph showing the surface plating structure of Comparative Example 4.
Figure 6:
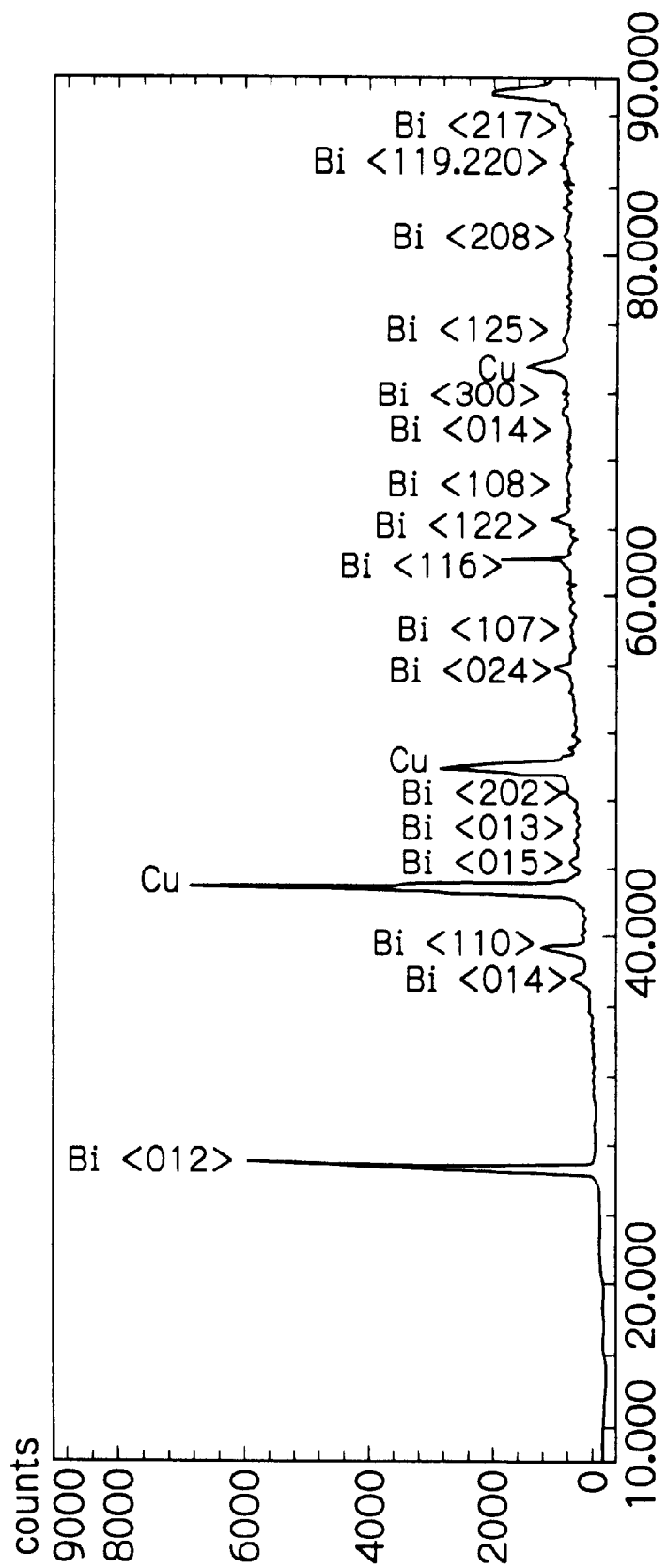
FIG. 6 is the X-ray diffraction chart of the plating layer formed in Comparative Example 4.
Figure 7:
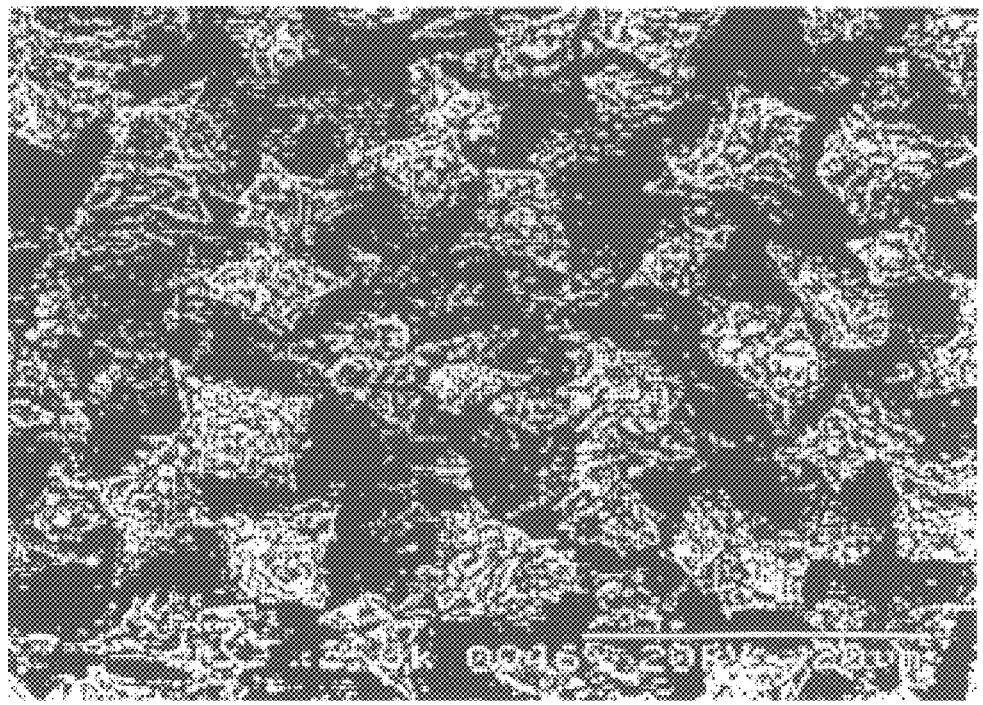
FIG. 7 is a photograph showing the surface plating structure of Comparative Example 6.

The plating surface structure of Example 1 is shown in FIG. 3. The X-ray diffraction chart of Example 1 is shown in FIG. 4. This is then converted using the powder intensity as the criterion. The plating surface structure of Comparative Example 4 is shown in FIG. 5. The X-ray diffraction chart of Comparitive Example 4 is shown in FIG. 6. This is then converted using the powder intensity as the criterion. The plating surface structure of Comparative Example 6 is shown in FIG. 7. The diameter of crystals of the plating layer is 2.8 μm in Example 1, 5.8 μm in Comparative Example 4, and 10.6 μm in Comparative Example 6.

Figure 8:
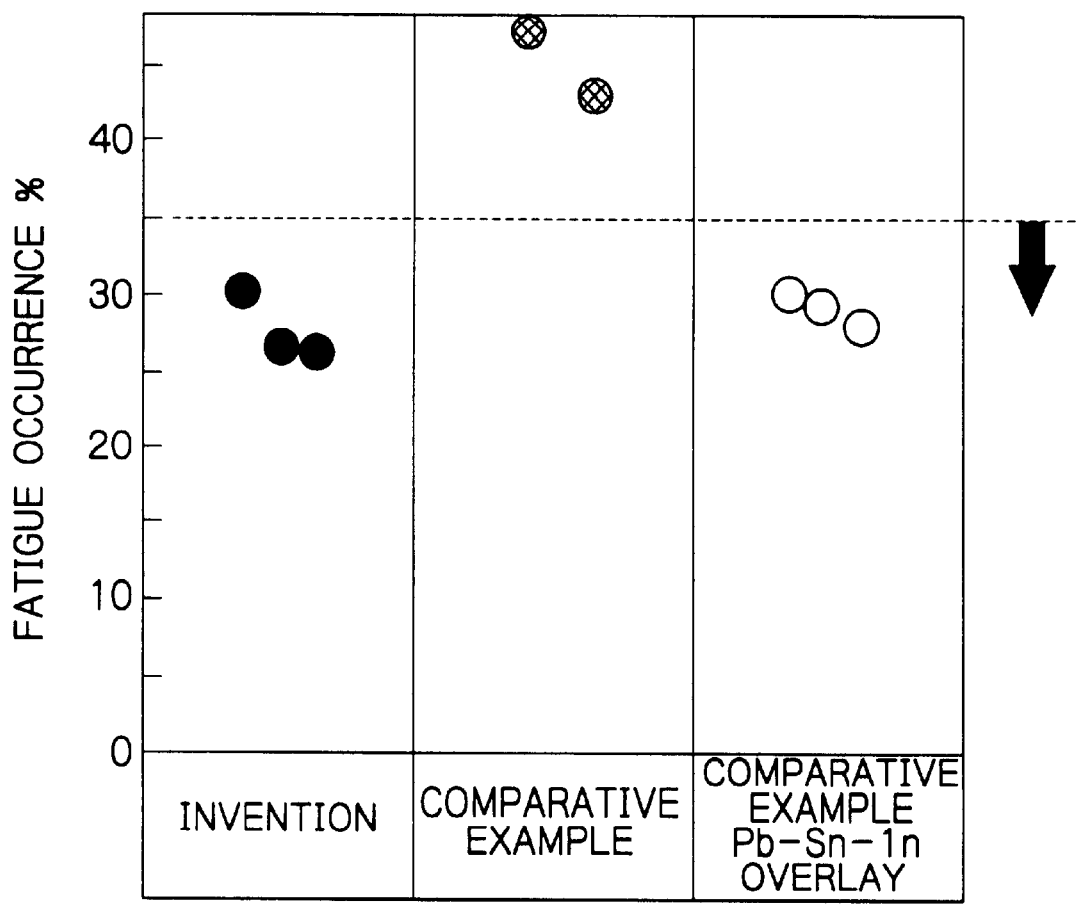
FIG. 8 is a graph showing the fatigue occurrence ratio of the examples and comparative examples.

The results of the test are shown in Table 1 and FIG. 8. The data "Comparative Example, Pb—Sn—In overlay" shown in FIG. 8 corresponds to the conventional Pb-based overlay which contains 10% of Sn and 10% of ln. This data would provide a criterion for comparison of the fatigue occurrence. From FIG. 8, it is apparent that the fatigue and seizure resistance of the inventive Examples 1 through 3 are superior to that of Comparative Examples 4 through 6 and comparable to that of the conventional Pb-based overlay.

TABLE 1

| | | Orientation Index of Miller Planes | | | | | | | | | | | Crystal Grains | Occurrence of Fatigue | Seizure Surface Pressure |
|---|---|---|---|---|---|---|---|---|---|---|---|---|---|---|---|
| | | 012 | 104 | 110 | 0.15 | 113 | 202 | 024 | 107 | 116 | 122 | 214 | 300 | μm | % | MPa |
| Example | 1 | 1.00 | 0.42 | 0.84 | 0.71 | 0.57 | 0.65 | 0.83 | 0.33 | 0.45 | 0.56 | 0.23 | 0.67 | 2.8 | 25.4 | 100 |
| | 2 | 1.00 | 0.75 | 1.25 | 2.05 | 0.63 | 1.01 | 0.86 | 1.34 | 0.82 | 0.42 | 0.54 | 0.48 | 9.8 | 26.1 | 100 |
| | 3 | 1.00 | 0.82 | 2.25 | 4.64 | 0.54 | 0.90 | 0.92 | 1.01 | 0.78 | 0.21 | 0.64 | 0.33 | 4.7 | 30.2 | 100 |
| Comparative | 4 | 100 | 0.10 | 0.22 | 0.45 | 0.15 | 0.11 | 0.97 | 0.83 | 0.07 | 0.07 | 0.15 | 0.64 | 5.8 | 48.1 | 70 |
| Example | 5 | 1.00 | 5.22 | 0.59 | 2.18 | 0.21 | 0.15 | 1.01 | 1.06 | 0.23 | 0.12 | 0.64 | 9.74 | 2.7 | 43.2 | 60 |
| | 6 | 1.00 | 0.22 | 0.28 | 0.33 | 0.36 | 0.33 | 0.86 | 0.67 | 0.23 | 0.29 | 0.41 | 0.23 | 10.6 | 34.8 | 50 |

As is described hereinabove, the conventional Pb-based overlay could be replaced with the Bi-based overlay according to the present invention.

What is claimed is:

1. A sliding bearing, which comprises a lining and a bismuth or bismuth-alloy overlay formed on the lining, wherein the relative ratio of the X-ray diffraction intensity $I_{[hkl]}$ of the bismuth or bismuth-alloy overlay defined below satisfies the following conditions (a) and (b):

(a) the relative ratio of the X-ray diffraction intensity $I_{[hkl]}$ of planes other than the {012} planes is from 0.2 to 5 times as high as the ratio of the X-ray diffraction intensity $I_{[012]}$, namely, $0.2I_{[012]} \leq I_{[hkl]} \leq 5I_{[012]}$ (b) the relative ratio of the X-ray diffraction intensity $I_{[hkl]}$ of three or more planes other than {012} planes ranges from 0.5 to 2 times as high as the ratio of the X-ray diffraction intensity $I_{[012]}$, namely, $0.5I_{[012]} \leq I_{[hkl]} \leq 2I_{[012]}$, where;

the {hkl} planes of bismuth crystals of standard powder samples having random orientation indicates the X-ray diffration intensity Rp (hkl); the {hkl} planes of bismuth crystals of said bismuth or bismuth-alloy overlay layer indicates the X-ray diffraction intensity $R_{O/L}$ (hkl); the ratio of both intensities is expressed by K (hkl)=$R_{O/L}$ (hkl)/Rp (hkl); the ratio of K (012) and the K (hkl) is expressed by $I_{[hkl]}$=K(hkl)/K(012).

2. A sliding bearing according to claim 1, further comprising a barrier layer formed between said lining and said bismuth or bismuth-alloy overlay.

3. A sliding bearing according to claim 1 or 2, wherein said planes other than {012} are {104}, {110} and {202}.

4. A sliding bearing according to claim 1 or 2, wherein said planes other than {102} additionally include {105}, {113}, {116}, {107}, {122}, {214} and {300}.

5. A sliding bearing according to claim 1 or 2, wherein said condition (a) is $0.5I_{[012]} \leq I_{[hkl]} \leq 2I_{[012]}$.

6. A sliding bearing according to claim 1 or 2, wherein said bismuth or bismuth-alloy overlay is an electro-plated layer.

7. A sliding bearing according to claim 6, wherein said planes other than the {012} planes are {104}, {110} and {202}.

8. A sliding bearing according to claim 7, wherein said planes other than the {012} planes additionally include {015}, {113}, {116}, {107}, {122}, {214} and {300 } planes.

9. A sliding bearing according to claim 6, wherein said condition (a) is $0.5I_{[013]} \leq I_{[hkl]} \leq 2I_{[012]}$.

10. A sliding bearing according to claim 6, wherein said bismuth or bismuth-alloy overlaya consists of crystal grains having not more than 10 µm of diameter.

11. A sliding bearing according to claim 10, wherein said planes other than the {012} planes are {104}, {110} and {202}.

12. A sliding bearing according to claim 11, wherein said planes other than the {012} planes additionally include {015}, {113}, {116}, {107}, {122}, {214}and {300}.

13. A sliding bearing according to claim 12, wherein said condition (a) is $0.5I_{f[012]} \leq I_{[hkl]} \leq 2I_{[012]}$.

14. A sliding bearing according to claim 1 or 2, wherein said overlay is from 2 to 20 µm thick.

* * * * *